Patented Feb. 19, 1935

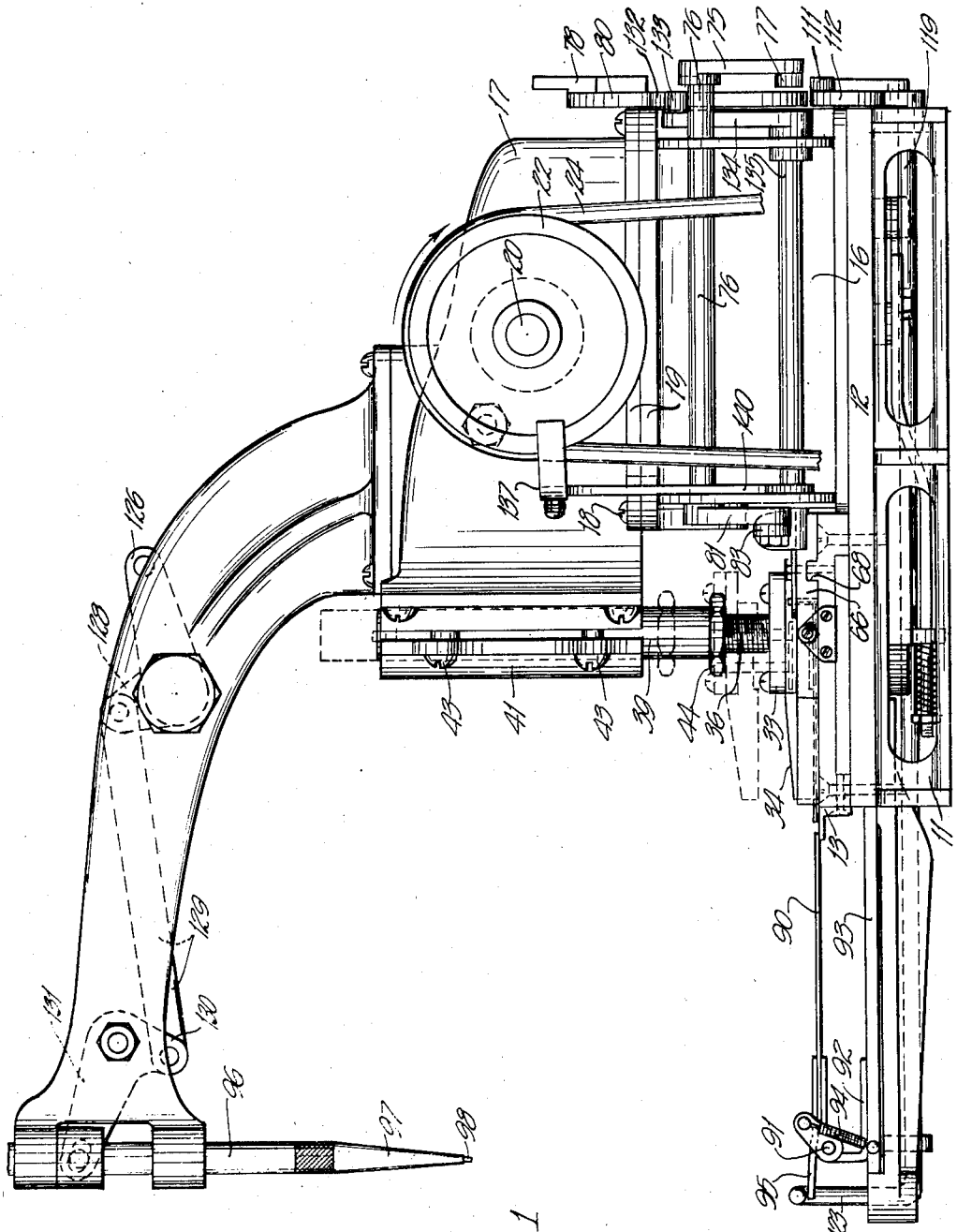

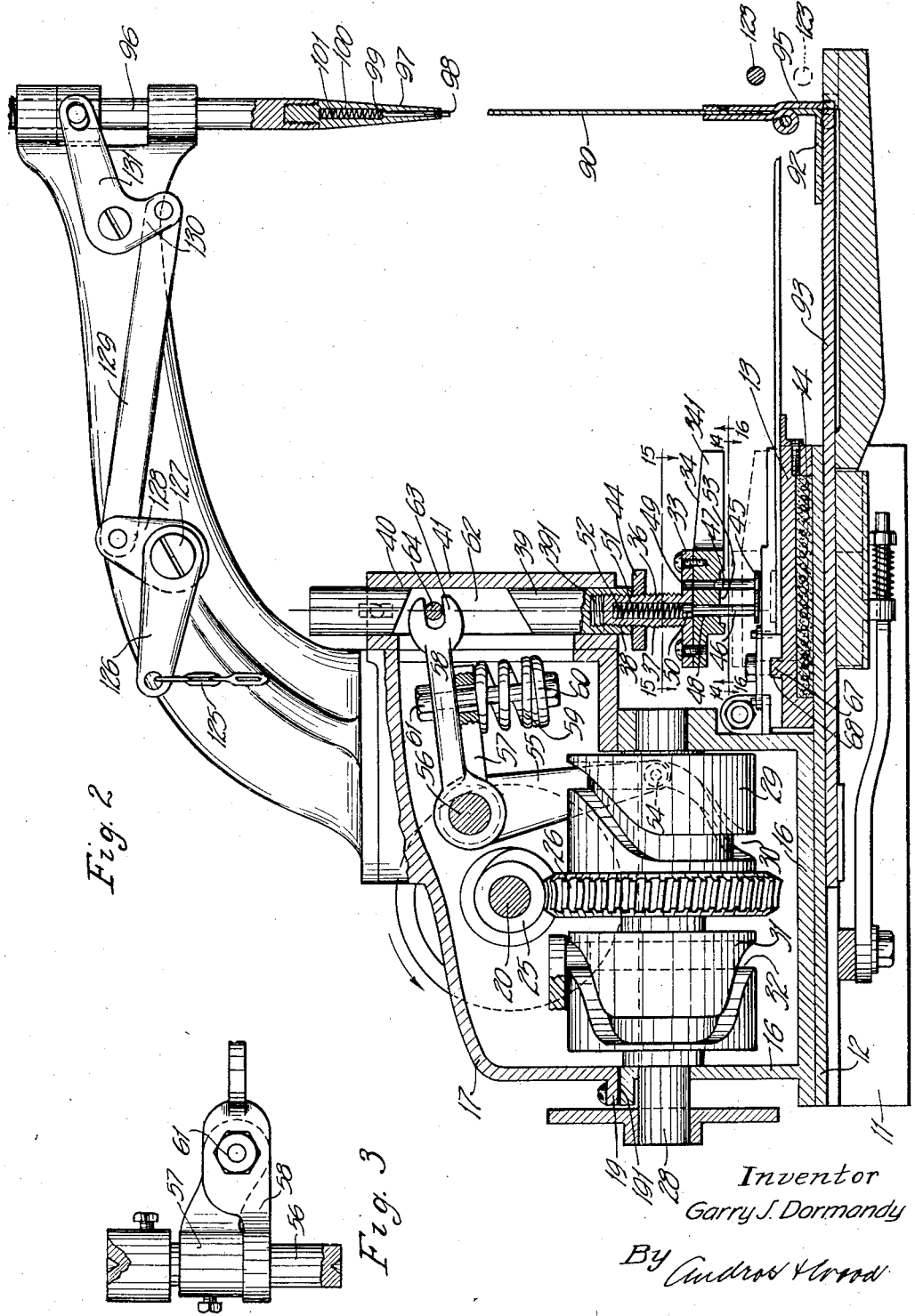

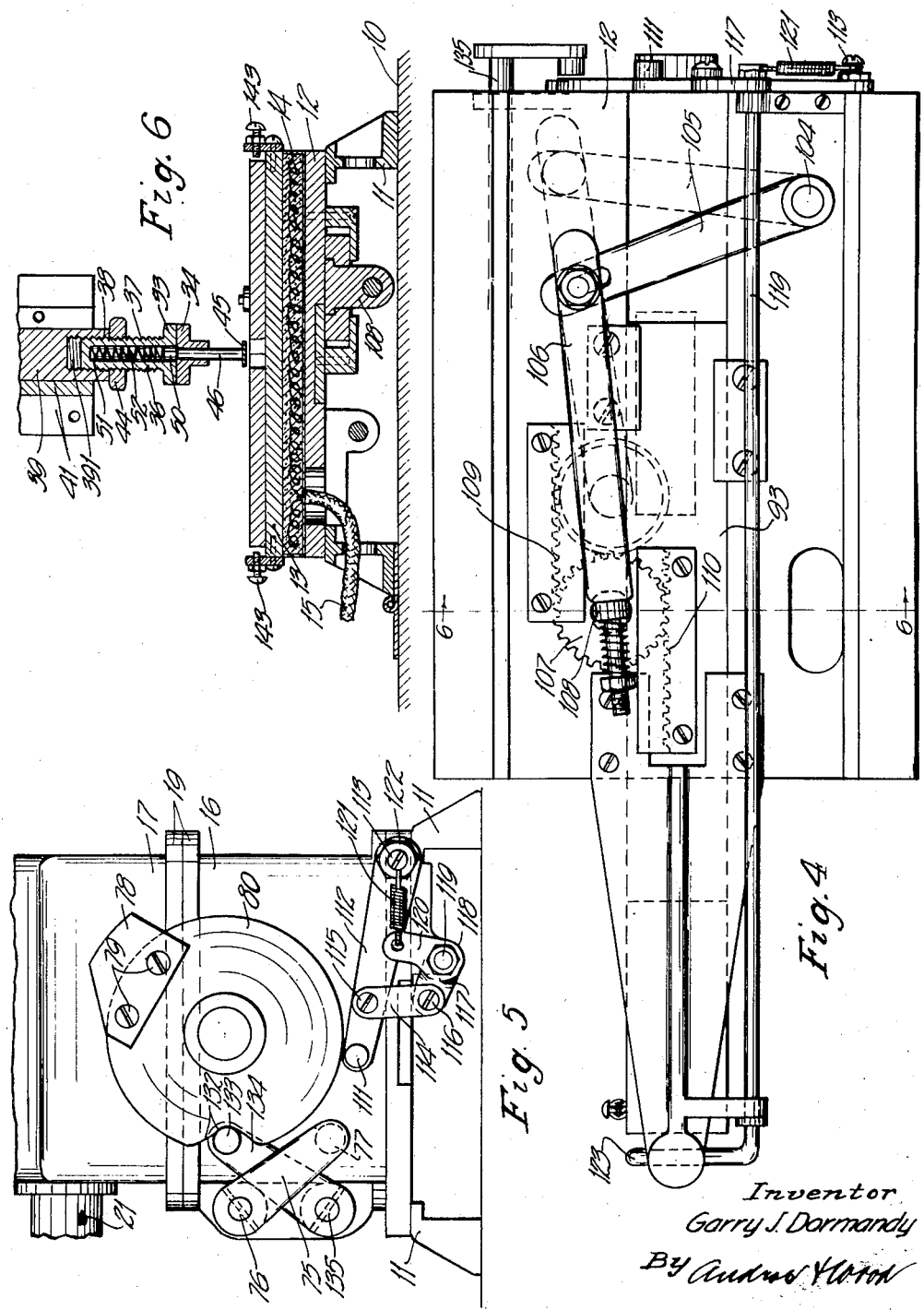

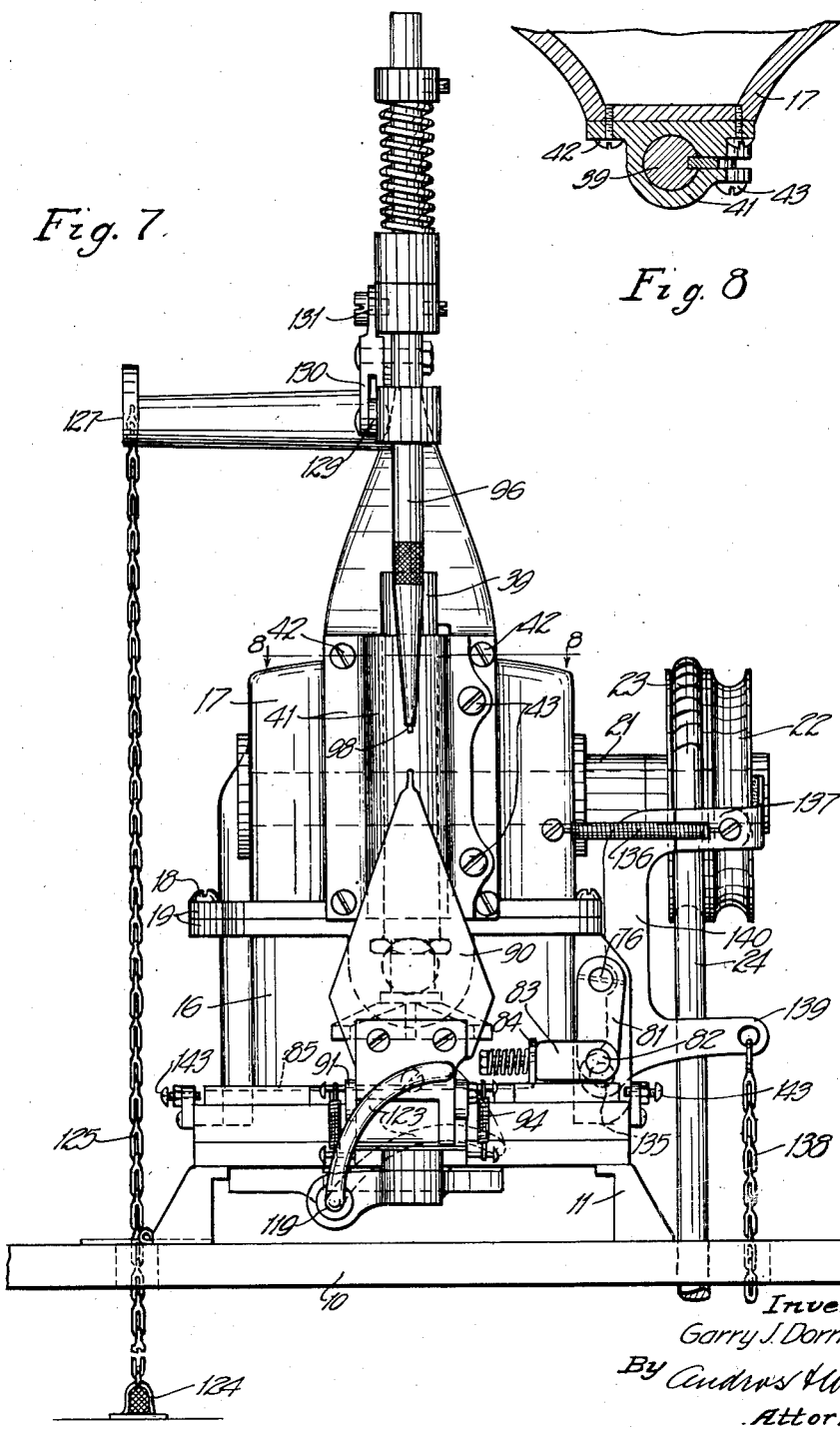

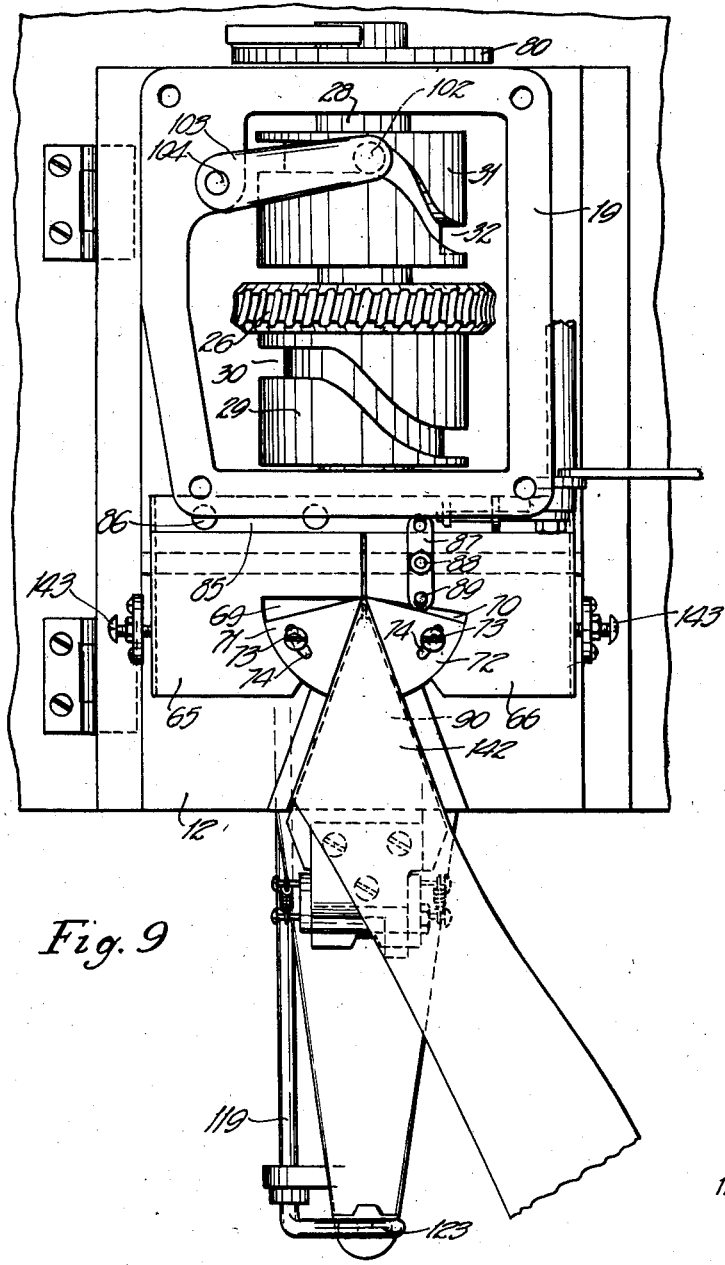
Fig. 9
Fig. 11
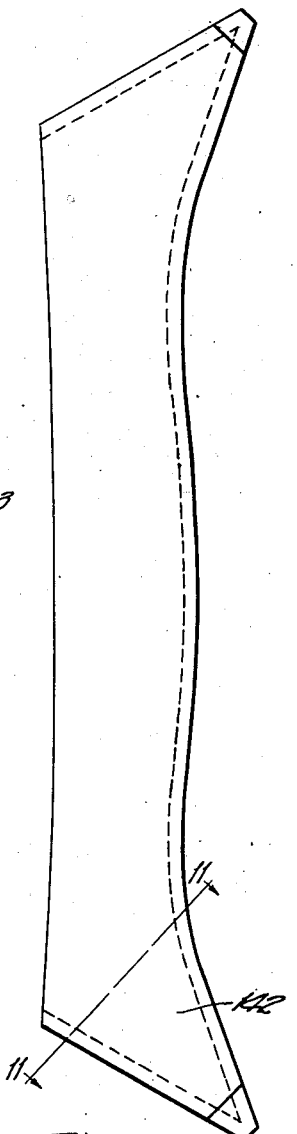
Fig. 10
Inventor
Garry J. Dormandy
By
Attorneys

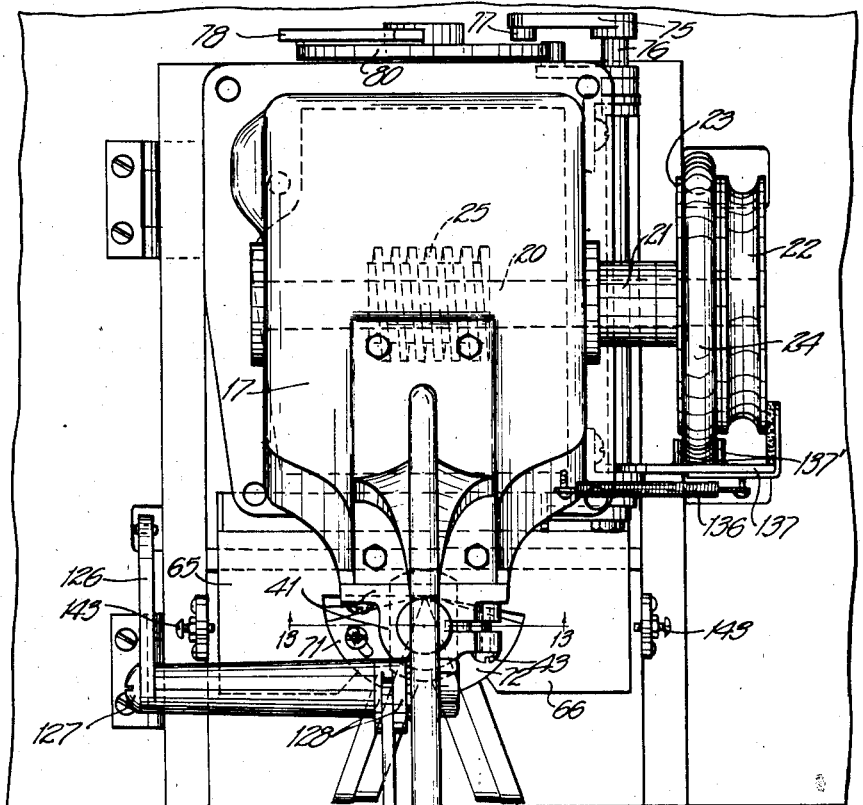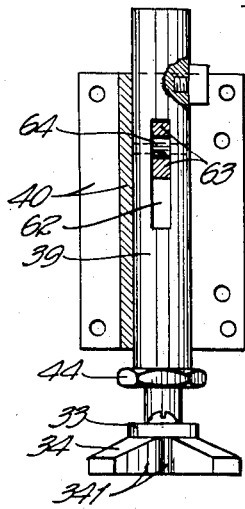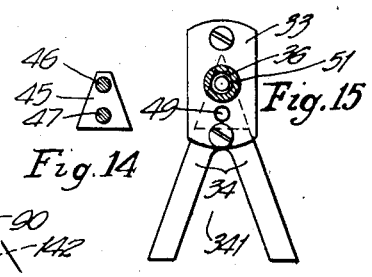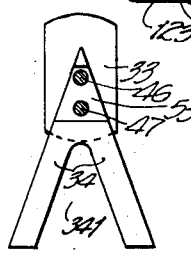

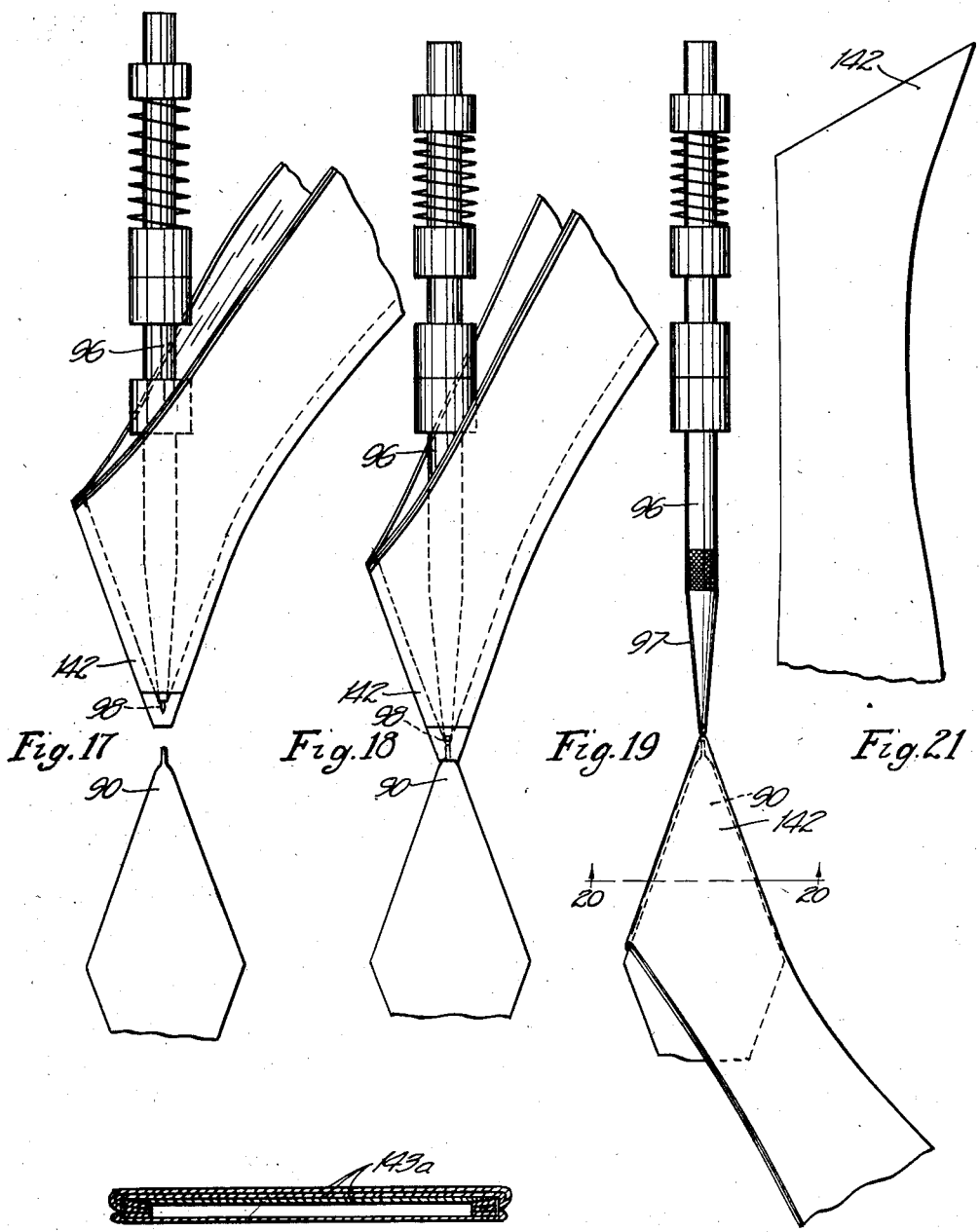

1,992,163

UNITED STATES PATENT OFFICE 1,992,163

MACHINE FOR TURNING THE POINTS OF COLLAR TOPS

Garry J. Dormandy, Troy, N. Y., assignor to M. Nirenberg Sons Inc., Troy, N. Y., a corporation of New York Application June 25, 1931, Serial No. 546,871

25 Claims. (Cl. 223—55)

My invention relates to collar turning and shaping machines, and method of operating the same, and, while adaptable for use in pressing the points of collars known as the stiff or starched variety, is particularly useful in turning and shaping the points of so-called soft or semi-soft collars, especially those with long, narrow, sharp points usually made by what is known as the hand method.

In making collars of this character, three and sometimes four plies of cloth are cut somewhat larger than the finished collar top. These plies of cloth are then secured together by a row of stitching a short distance from the edge, which extends along one side and across the two ends of the collar. The collar is then turned inside out by hand, leaving the margin of cloth between the edge and the stitches on the inside of the finished collars. It is apparent that this large volume of cloth creates a bunch on the inside of the point of a narrow, sharp-pointed collar which will leave the point comparatively thick and there will be a tendency to bulge the edges of the collar at each side of the point beyond the desired finish line. In laundering, these points are usually pressed with a flat iron and due to the extreme thickness of the cloth these bulges are greatly exaggerated when flattened in the ironing operation and give the point of the collar an unsightly and irregular appearance.

My invention provides a machine that overcomes the difficulties above enumerated and which have heretofore been commonly encountered in the manufacture of collars.

In accordance with my invention the points of collar tops are formed of the precise shape desired and without unsightly bulges or irregularities, and the operations are carried out expeditiously and at a very substantial reduction in cost.

One of the objects of my invention is the provision of a forming plate associated with means which enable the operator quickly and accurately to place the collar top in position over the forming plate.

An other object of my invention is the provision of means for inserting the collar while held on the forming plate into collar shaping position and then withdrawing the forming plate from the collar point prior to the pressing operation.

Other objects of my invention will appear from the specification and will be particularly pointed out in the claims. My invention will best be understood by reference to the accompanying drawings in which I have illustrated a preferred embodiment of my invention and in which Fig. 1 is a side view of a machine embodying my invention;

Fig. 2 is a view of the machine from the side opposite to that of Fig. 1 and partially broken away to illustrate working parts of the machine;

Fig. 3 is a fragmentary plan view of a detail;

Fig. 4 is a bottom plan view of the machine;

Fig. 5 is a rear view;

Fig. 6 is a section taken along the line 6—6 of Fig. 4;

Fig. 7 is a front view;

Fig. 8 is a section taken along the line 8—8 of Fig. 7;

Fig. 9 is a plan view with the cover of the oil-tight casing removed;

Fig. 10 is a plan view of a collar top;

Fig. 11 is a section along the line 11—11 of Fig. 10;

Fig. 12 is a plan view;

Fig. 13 is a sectional elevation in about the plane 13—13 of Fig. 12 illustrating the presser head and the guide block therefor;

Fig. 14 is a sectional plan view along the line 14—14 of Fig. 2;

Fig. 15 is a sectional plan view along the line 15—15 of Fig. 2;

Fig. 16 is an inverted sectional plan view on the line 16—16 of Fig. 2;

Figs. 17, 18 and 19 are fragmentary views illustrating the upper portion of the forming plate and the plunger associated therewith which enable the operator readily to place the collar over the forming plate right side out, Fig. 17 illustrating the collar drawn over the plunger wrong side out, Fig. 18 illustrating the collar still in position over the plunger but brought into engagement with the tip end of the forming plate and Fig. 19 illustrating the collar drawn from the plunger over the forming plate which operation turns the collar right side out and ready for the pressing operation;

Fig. 20 is a sectional view taken along the line 20—20 of Fig. 19, and

Fig. 21 is a fragmentary view illustrating a portion of a collar top prior to the pressing operation.

Like reference characters indicate like parts throughout the drawings.

Referring now to the drawings 10 is a table forming a support for the machine proper. Standards or brackets 11 extend upwardly from the table 10 and a bed plate 12 is mounted on the standards or brackets 11. On the front of the bed plate 12 is mounted a pressing bed 13 which is preferably heated. In the embodiment of my invention illustrated the pressing bed is heated by an electrical heating unit 14, one of the terminals of which is illustrated at 15 (see Fig. 6).

The lower portion of an oil-tight casing 16 is supported upon the bed plate 12 and is suitably secured thereto, some of the operating parts of the machine being located in said casing. A cover 17 for the casing is secured to the lower portion as by screws 18 passing through the flanges 19 with which the lower portion and the cover portion respectively are provided, a gasket 191 preferably being interposed between the two flanges.

A drive shaft 20 has its bearings in the cover 17 of the casing, one of such bearings being shown at 21 in Figs. 7 and 12. Mounted on the shaft 20 is a pulley 22 which is fast on the shaft and constituting a driven member and a loose pulley 23, a suitable belt constituting a driving member connected to any suitable source of power being indicated at 24 and engageable either with the fast or loose pulley. A worm 25 engages a worm wheel 26 secured to a shaft 28 which has its bearings in the lower portion 16 of the casing. A cam wheel 29 is also secured to the shaft 28 and is provided with a cam groove 30 as best shown in Fig. 2. A second cam wheel 31 is also secured on the shaft 28 and is provided with a cam groove 32.

A presser head, indicated generally at 33, as best shown in Figs. 1, 2 and 7 is actuated by the cam 29. A presser plate 34 is secured to the upper portion of the presser head 33, as by screws, as indicated in Fig. 2. The presser head is preferably provided with a V-shaped recess 341. The presser head is supported on a stem 36 preferably provided on its exterior with screw threads 37 engaging screw threads 38 in a recess 391 in the plunger 39. The plunger 39 is received in an opening 40 of a guide block 41 which may be secured to the front of the casing as by screws 42. The freedom of movement of the plunger within the guide block may be controlled by adjusting screws 43 as best shown in Figs. 1, 7 and 12. The presser head may be secured in the desired adjusted position by lock nut 44.

A retaining plate 45 is preferably mounted on the presser head and is provided, in the embodiment illustrated with two stems 46 and 47 engaging openings 48 and 49 respectively in the presser head. In the embodiment illustrated the stem 46 is longer than the stem 47 and is provided at its upper end with a head 50 which is received in an opening 51 in the stem 36 and somewhat larger than the opening 48 with which it registers. A coil spring 52 is interposed between the head 50 and the wall at the upper end of the opening 51 and tends to press the retaining plate 45 downwardly into the full-line position indicated in Fig. 2. The lower portion of the presser plate 34 is preferably provided with a recess 53 having the contour of the retaining plate 45 so that when the presser plate is brought downwardly into engagement with the collar point the retaining plate 45 is flush with the lower surface of the presser plate.

The plunger 39 is actuated by the cam 29. A roller 54 mounted on the free end of an arm 55 engages the groove 30 of the cam. The arm 55 is secured to a shaft 56 having its bearings in the cover plate 17 of the casing. A second arm 57 is also secured to the shaft 56. The plunger 39 is actuated from the arm 57 through a yielding connection comprising an arm 58 which is loosely mounted on the shaft 56. The yielding connection comprises a coil spring 59 which is interposed between the arm 57 and the head 60 on a bolt passing through openings in both of the arms 57 and 58 and provided with a head 61 which engages the upper side of the arm 58.

The free end of the arm 58 passes through slots formed in the wall of the casing and the rear side of the guide block, as best shown in Fig. 2 and passes into a slot 62 with which the plunger is provided. The end of the arm 58 is bifurcated at 63, the bifurcated or forked end of the arm engaging a pin 64 extending across the slot.

It will be apparent, therefore, that the yielding connection which is interposed between the arms 57 and 58 permits the movement of the parts after the presser plate has engaged the collar.

Two plates 65 and 66 are mounted on the pressing bed 13 and are movable laterally towards and away from each other as viewed in Fig. 9. The pressing bed 13 is provided with a rib 67 extending upwardly and transversely of the bed. The plates 65 and 66 are provided with grooves 68 as shown in Fig. 2 in which the rib 67 is received and which serve to guide the plates. The plates 65 and 66 are provided with recesses 69 and 70 respectively, each having an arcuate edge, as indicated in Fig. 9. An external die comprises the pressing bed 13 and pressing jaws or walls 71 and 72 are mounted in the recesses 69 and 70 respectively and are provided with arcuate edges engaging the corresponding edges of the plates 65 and 66, and the facing edges of the pressing jaws are arranged at an angle to each other which conforms to the angle of the collar point which is to be pressed. The pressing bed 13 extends transversely of the walls 71 and 72. The pressing jaws 71 and 72 are provided with slots 74 through which screws 73 pass by which the angle between the jaws 71 and 72 may be varied to correspond to the angle of the collar point. The plates 65 and 66 and the jaws mounted thereon are actuated by an arm 75 as best shown in Fig. 5 mounted on a shaft 76 extending along the side of the machine. The free end of the arm 75 is provided with a roller 77 located in the path of the cam 78 which is secured as by screws 79 on a cam disc 80. When the cam 78 engages the roller 77 the shaft 76 is rocked clockwise, as viewed in Fig. 5, and anti-clockwise, as viewed in Fig. 7. On the front end of the shaft 76 is mounted an arm 81 (see Fig. 7), the free end of which is pivoted as at 82 to a link 83 connected to an upturned end 84 of a plate or bar 85 which is secured to the plate 65, as by screws 86 (see Fig. 9). A yielding connection is preferably interposed between the link 83 and the plate 85 and as this yielding connection is of the same character as that which is interposed between the arms 57 and 58, the same need not be specifically described. The bar 85 is connected to one end of a lever 87 which is pivoted at 88 (see Fig. 9) to a stationary part of the machine, the opposite end of the lever 87 being pivoted as at 89 to the sliding plate 66 which is provided with a slightly elongated slot in which the pivot pin is received. When the cam 78 engages the roller 77, therefore, the two plates and the jaws 71 and 72 carried thereby are brought together, the yielding connection which is interposed between the link 83 and the sliding bar 85 permitting movement of the actuating parts after the plates 65, and 66 and the jaws 71 and 72, which are carried thereby, are brought into engagement and into position for pressing the collar point.

A forming plate 90 (Figs. 1 and 2) is pivoted at its lower end at 91 on a bracket 92, which is suitably secured on the forward end of a sliding plate 93 which is received in a recess in the lower side of the bed plate 12, as indicated in Fig. 6. The plate 90 is held in either of its two positions by an over-centering spring 94. The downward movement of the plate is limited by its engagement with the pressing bed 13, as illustrated, for example, in Fig. 1. The plate is provided with an extension arm 95 which is actuated to bring the plate to vertical, by mechanism which will hereinafter be described, the arm 95 engaging the upstanding part of the bracket 92 as best shown in Fig. 2.

Cooperating with the forming plate 90 is a plunger 96 tapered at its lower end as at 97 and preferably provided at its tip with a stem 98. The stem extends upwardly in a recess in the tip of the plunger and the head 99 thereof engages the lower end of a recess 100 in the tip of the plunger, the stem normally being forced downwardly by a coil spring 101. At the same time the coil spring 101 permits the stem 98 yieldingly to engage the upper end of the forming plate 90. The plate 93 with the forming plate carried thereby when in horizontal position is forced rearwardly by the cam 31, thereby forcing the forming plate 90 between the jaws 71 and 72 and slightly separating the plates 65 and 66 on which the jaws are mounted. A roller 102 is mounted on the free end of an arm 103 which is in turn mounted on a vertically disposed shaft 104. To the lower end of the shaft 104 (see Fig. 4) is secured an arm 105 which is preferably approximately twice the length of the arm 103. The free end of the arm 105 is pivoted to a link 106 which is connected to the plate 93 through a speed increasing device which, in the embodiment illustrated, comprises a gear 107. The link 106 is provided with a reduced end extending through a hub 108 loosely mounted in the gear as best shown in Figs. 4 and 6. A yielding connection of the character heretofore described is interposed between the link 106 and the gear 107. The gear engages at one side a stationary rack 109, the other side of the gear 107 engaging a rack 110 which is mounted on the movable plate 93. By the use of the gear and rack the movement of the plate 93 is approximately twice that of the link 106 and as the arm 105 is substantially twice as long as the arm 103 the movement of the plate 93 is four times as great as the movement of the roller 102 longitudinally of the axis of the shaft on which the cam is mounted.

After the forming plate has been inserted in position between the jaws 71 and 72 and spread the same, it is retracted by the same cam movement while the collar is being retained in position by the retaining plate 45. When the forming plate has reached its extreme forward limit of movement, it is tripped to its vertical position by the cam 78 engaging with a cam roller 111 mounted on the end of an arm 112 pivoted at 113. A link 114 is pivoted at 115 on the arm 112, the opposite end of the link being pivoted at 116 to the end of one arm 117 of a bell crank 118, secured on a shaft 119, the other arm 120 of the bell crank being connected by a coil spring 121 to a stationary part 122. To the opposite end of the shaft 119 is attached an arm 123 which is adapted to engage the extension member 95 on the forming plate 90 and thereby raise the forming plate to the vertical position shown in Fig. 2 where it is retained by the over-centering spring 94.

In the embodiment of my invention illustrated, the plunger 96 is depressed by a pedal 124 connected by a chain 125 to an arm 126 (see Figs. 2 and 7) which is secured to a shaft 127 to which in turn is connected a yoke 128 in which is received one end of a link 129, the opposite end being connected to one arm 130 of a bill crank, the opposite end 131 of which is connected to the plunger 96.

The cam disc 80 is provided with a recess 132 in which is received a roller 133 mounted on the end of an arm 134 attached to a shaft 135. Normally, when the machine is not in operation, the driving belt 24 is retained in position on the loose pulley by a coil spring 136 connected to an arm 137 which is provided with lugs 137' embracing the belt 24 as indicated in Fig. 12.

In order to start the machine, the operator depresses a pedal (not illustrated) which is connected by a chain 138 to one arm 139 of a bell crank which is secured to shaft 135, the opposite arm 140 of the bell crank being connected to or forming part of the arm 137 above described. When the pedal is depressed against the action of the spring 136, the belt 24 is forced from the loose pulley to the fast pulley, the shaft 135 is rocked, thereby freeing the roller 133 from the recess 132 and the machine starts a cycle of operations.

The operation of my invention is as follows: The operator first places a collar point 142 over the point of the plunger 96, with the unfinished portion of the collar outside. The collar may comprise a plurality of plies 143a as indicated in Figs. 11 and 20 which tends to produce bunching on the inside of the finished collar and particularly at the point thereof. The pedal 124 is then depressed thereby forcing the tip of the plunger 96 into engagement with the top of the forming plate 90 as indicated in Fig. 18. The operator then pulls the point of the collar downwardly from the plunger 96 over the forming plate to the position indicated in Fig. 19 at which time the collar point is right side out, and he then trips the forming plate 90 from the vertical position to the horizontal position indicated in Fig. 1. The other pedal which forces the belt 24 from the loose pulley to the pulley which is fast on the shaft is then depressed thereby starting a cycle of operations. The cam 31 moves the plate 93 carrying the forming plate with the collar thereon into position between the jaws 71 and 72 in the manner heretofore described, thereby separating the jaws and the plates 65 and 66 on which they are mounted. The movement of the jaws away from each other is limited by set screws 143, and by regulating the positions of the set screws, the spread of the plates 65 and 66 caused by forcing the forming plate 90 between the same and of the jaws 71 and 72 may be regulated, thereby regulating the position to which the apex of the forming plate is forced. While the forming plate is receding from its position underneath the retaining plate, the jaws 71 and 72 are forced towards each other thereby forcing the edges of the collar underneath the retaining plate, it being understood that the edges of the retaining plate are arranged at an angle substantially the same as that between the jaws 71 and 72, and that the retaining plate serves to limit the movement of the jaws towards each other. Before the forming plate begins to recede, cam 29 depresses the presser head 33 sufficiently to bring the retaining plate 45 into engagement with the collar to retain the same in pressing position while the forming plate is being retracted. The continued downward movement of the presser head brings the same forcibly into engagement with the collar. The jaws 71 and 72 prevent lateral displacement of the collar, which is neatly pressed to a finished point along two converging straight lines, the heating unit assisting in the pressing operation.

At the time that the pressing operation is being carried out the forming plate has been retracted and is tripped to the vertical position shown in Fig. 2.

After the plunger or stem on which the pressing head is mounted has completed the pressing operation, it is raised, the roller 133 drops into the recess 132 on the cam disc 80 and the operation of the machine is automatically stopped.

While I have described my invention in its preferred embodiment, it is to be understood that the drawings are purely illustrative and that the words which I have used are words of description rather than of limitation. Hence, structural changes may be made within the scope of the appended claims without departing from the true scope and spirit of my invention in its broader aspects.

What I claim is:

1. In a device for shaping the points of collar tops the edges of which are stitched together, means for pressing the collar point, means for preventing lateral spread of the collar point during the pressing operation, a forming plate over which the collar point may be stretched, means for automatically inserting said plate with the collar into collar pressing position, and means for withdrawing said forming plate from the collar prior to the pressing operation.

2. In a device for turning and shaping the points of collar tops, means for pressing the collar point, means for preventing lateral spread of the collar point during the pressing operation, a pivoted forming plate movable to either of two positions, a member over which a collar point may be turned inside out, means for moving said member to a position adjacent to said forming plate thereby enabling the operator to turn the collar point from said member onto said forming plate right side out, means for forcing said plate with the collar thereon into pressing position, and automatic means for withdrawing said plate from the collar point prior to the pressing operation.

3. In a device for turning and shaping the points of collar tops, means for pressing the collar point, means for preventing lateral spread of the collar point during the pressing operation, a pivoted forming plate movable to either of two positions, a member over which a collar point may be turned inside out, means for moving said member to a position adjacent to said forming plate thereby enabling the operator to turn the collar point from said member onto said forming plate right side out, means for forcing said plate with the collar thereon into pressing position, automatic means for withdrawing the forming plate from the collar point prior to the pressing operation, and automatic means for moving said forming plate when withdrawn to a position for the reception of a collar point.

4. A device for shaping the points of collar tops, a pair of angularly disposed jaws for preventing lateral spread of the collar point during the pressing operation, a pressing head conforming generally to the angle of the collar point, a forming plate over which the collar top may be stretched, automatic means for inserting said plate with the collar in position between said jaws, means for retaining the collar point in position, means for withdrawing said forming plate while retaining the collar point in position and means for forcing said pressing head into engagement with the collar.

5. In a device for shaping and pressing collar points, a pressing bed for the collar point, a pair of angularly disposed relatively movable jaws for laterally confining the edges of the point during the pressing operation, means for limiting the outward movement of said jaws, a forming plate over which a collar point may be stretched and conforming substantially to the angle of said point, and yielding means for forcing said forming plate between said jaws and thereby separating the same until they reach their limit of movement.

6. In a device for shaping and pressing collar points, a pressing bed for the collar points, a pair of angularly disposed relatively movable jaws for laterally confining the edges of the point during the pressing operation, means for limiting the outward movement of said jaws, a forming plate over which a collar point may be stretched and conforming substantially to the angle of said point, yielding means for forcing said forming plate between said jaws and thereby separating the same until they reach their limit of movement, means for retaining the collar point in position between said jaws, means for withdrawing the plate while the collar point is so retained, and means for pressing the collar point.

7. In a device for shaping and pressing collar points, a pressing bed, angularly disposed pressing jaws, a forming plate over which the collar point may be stretched, automatic means for inserting the collar point in position between said pressing jaws and on said pressing bed, means for withdrawing the forming plate from the collar point while retaining the point in pressing position, means for pressing the collar point, and automatic means for stopping the operation of the machine after a complete cycle of operations.

8. In a device for shaping and pressing collar points, a pressing bed, angularly disposed pressing jaws, a forming plate for the collar point, automatic means for inserting the forming plate with the collar point in position between said pressing jaws and on said pressing bed, means for withdrawing the forming plate from the collar point while retaining the point in pressing position, means for pressing the collar point, automatic means for stopping the operation of the machine after a complete cycle of operations, and manually operated means for starting the operation of the machine.

9. In a device for shaping and pressing collar points, a pressing bed, angularly disposed pressing jaws for preventing lateral spread of the collar during the pressing operation, yielding means for forcing said jaws towards each other, a forming plate over which the point of a collar may be stretched, means for forcing said forming plate with a collar point stretched thereover into pressing position and thereby spreading said jaws, means for limiting the movement of said jaws away from each other, means for retaining said collar point in position, means for withdrawing said forming plate from said collar point while retaining the latter in position, and means for pressing the collar point.

10. In a device for turning and shaping the points of collars, a plunger over which a collar point may be placed, a forming plate located adjacent to said plunger and over which the collar point may be reversed, means for shaping the collar point, and means for conveying the collar point while on the forming plate to a position in which the forming plate cooperates with the shaping means to shape the point.

11. In a device for turning and shaping the points of collars, a plunger over which a collar point may be placed, a forming plate located adjacent to said plunger and over which the collar point may be reversed, means for shaping the collar point, means for conveying the collar point while on the forming plate to a position to be shaped, and means for retracting said forming plate while the collar point is being shaped.

12. In a device for shaping and pressing collar points, a pressing bed, angularly disposed pressing jaws for preventing lateral spread of the collar point during the pressing operation, yielding means for forcing said jaws towards each other, a forming plate over which a point of a collar may be stretched, means for forcing said forming plate with a collar point stretched thereover into pressing position and thereby spreading said jaws, means for retracting the forming plate and simultaneously forcing said jaws together, and means for pressing the collar point.

13. In a device for shaping and pressing collar points, a pressing bed, angularly disposed pressing jaws for preventing lateral spread of the collar point during the pressing operation, yielding means for forcing said jaws towards each other, a forming plate over which a point of a collar may be stretched, means for forcing said forming plate with a collar point stretched thereover into pressing position and thereby spreading said jaws, a retaining plate for engaging said collar point, means for withdrawing said forming plate from said collar point and simultaneously forcing said jaws towards each other, said retaining plate serving to limit the movement of said jaws towards each other, and means for pressing the collar point.

14. In a device for shaping and pressing collar points, a pressing bed, angularly disposed pressing jaws for preventing lateral spread of the collar point during the pressing operation, yielding means for forcing said jaws towards each other, a forming plate over which a point of a collar may be stretched, means for forcing said forming plate with a collar point stretched thereover into pressing position and thereby spreading said jaws, a retaining plate the edges of which are arranged at an angle substantially the same as that between said jaws, said retaining plate serving to limit the movement of said jaws towards each other.

15. In a device for turning and shaping the points of collar tops, means for pressing the collar point, means for preventing lateral spread of the collar point, during the pressing operation, a forming plate over which the collar may be manually turned, right side out, automatic means for forcing said plate with the collar thereon into pressing position and automatic means for withdrawing said plate from the collar prior to the pressing operation.

16. In a device for shaping and pressing collar points, a pressing bed for the collar point, a pair of angularly disposed relatively movable jaws for laterally confining the edges of the point during the pressing operation, a forming plate over which a collar point may be stretched and conforming substantially to the angle of said point, and yielding means for forcing said forming plate between said jaws and thereby separating the same until they reach their limit of movement.

17. In a device for shaping and pressing collar points, a pressing bed for the collar points, a pair of angularly disposed relatively movable jaws for laterally confining the edges of the point during the pressing operation, a forming plate over which a collar point may be stretched and conforming substantially to the angle of said point, yielding means for forcing said forming plate between said jaws and thereby separating the same until they reach their limit of movement, means for retaining the collar point in position between said jaws, means for withdrawing the plate while the collar point is so retained, and means for pressing the collar point.

18. In a device for shaping and pressing collar points, a pressing bed, a pair of angularly disposed relatively movable jaws for laterally confining the collar point, a forming plate on which the collar point may be placed and conforming substantially to the angle of said point, means for forcing said forming plate carrying said collar between said jaws and for withdrawing said plate therefrom, means for retaining said collar point in position while the forming plate is being withdrawn, and means for pressing the collar point.

19. In a device for shaping and pressing collar points, a pressing bed, a presser, a pair of angularly disposed relatively movable jaws for laterally confining the collar point, a forming plate over which the collar point may be placed and conforming substantially to the angle of said point, means for forcing said forming plate carrying said collar between said jaws and for withdrawing said plate therefrom, a retaining plate yieldingly mounted on said presser and conforming substantially to the angle of said point, means for actuating said presser, and means for producing relative movement of said jaws toward each other.

20. In a device for shaping and pressing collar points, a pressing bed, a presser, a pair of angularly disposed relatively movable jaws for laterally confining the collar point, a forming plate over which the collar point may be placed and conforming substantially to the angle of said point, means for forcing said forming plate carrying said collar between said jaws thereby forcing said jaws apart and for withdrawing said plate therefrom, means comprising a yielding connection for producing relative movement of said jaws toward each other, a retaining plate yieldingly mounted on said presser and conforming substantially to the angle of said point, and means for actuating said presser.

21. In a device for shaping and pressing collar points, a presser bed, a presser head, a pair of angularly disposed relatively movable jaws for laterally confining the collar point, a forming plate over which the collar point may be placed and conforming substantially to the angle of said point, means for forcing said forming plate carrying said collar between said jaws thereby forcing said jaws apart and for withdrawing said plate therefrom, means comprising a yielding connection for producing relative movement of said jaws towards each other, a retaining plate yieldingly mounted on said presser head and conforming substantially to the angle of said point, and means for actuating said presser head, said presser head being provided with a recess conforming to the contour of said retaining plate in which the latter is received.

22. In a device for shaping the points of collar tops, means for pressing the collar point, means for preventing lateral spread of the collar points during the pressing operation, a forming plate, a member located adjacent to the forming plate over which the collar point may be placed wrong side out and from which it may manually be transferred to the forming plate right side out, and means for moving the forming plate with the collar thereon into pressing position and thereby transferring the collar from said member to the pressing means.

23. In a device for shaping and pressing collar points, a pressing bed, movable angularly disposed jaws for confining the edges of the collar point, a forming plate over which the point of a collar may be stretched, means for forcing said forming plate with a collar point stretched thereover into position between said jaws and thereby spreading the same, means for retaining said collar point in position, means for withdrawing said forming plate from said point, means for forcing said jaws towards each other after the withdrawal of the forming plate and prior to the pressing operation and thereby forcing the material of the collar point inwardly to produce the desired form of collar point, and means for pressing the collar point.

24. A device for pressing and shaping collar tops comprising a forming plate having an end adapted to receive a collar top the edges of which are stitched together, an external die comprising a pressing bed and walls closely following the edges of said forming plate extending above said bed whereby to confine the collar point, the face of said pressing bed upon which the collar top is received extending transversely of said walls, a pressing plate, a mechanically operated driving member normally moving when the machine is in use, a driven member, means whereby said driving member may be connected to and disconnected from said driven member, and means actuated by said driven member for automatically positioning said forming plate with the collar point thereon on said pressing bed between said walls, means also actuated by said driven member for withdrawing said forming plate and then moving the said pressing plate into pressing engagement with said collar point in timed relation to the movement of said forming plate.

25. A device for pressing and shaping collar tops comprising a forming plate having an end adapted to receive a collar top the edges of which are stitched together, an external die comprising a pressing bed and walls closely following the edges of said forming plate extending above said bed whereby to confine the collar point, the face of said pressing bed upon which the collar top is received extending transversely of said walls, a pressing plate, a mechanically operated driving member normally moving when the machine is in use, a driven member, means whereby said driving member may be connected to and disconnected from said driven member, and means actuated by said driven member for automatically positioning said forming plate with the collar point thereon on said pressing bed between said walls, and means for moving said pressing plate into pressing engagement with said collar point in timed relation to the movement of the forming plate and then lifting said pressing plate out of engagement with said collar point, and means for automatically disconnecting said driven member from said driving member when said pressing plate is in raised position.

GARRY J. DORMANDY.